US008286351B2

(12) United States Patent
Edamatsu et al.

(10) Patent No.: US 8,286,351 B2
(45) Date of Patent: Oct. 16, 2012

(54) MANUFACTURING METHOD OF LIQUID DISCHARGE HEAD

(75) Inventors: Keiji Edamatsu, Fukushima (JP); Yoshinori Tagawa, Yokohama (JP); Kazuhiro Asai, Kawasaki (JP); Satoshi Ibe, Yokohama (JP); Hiroto Komiyama, Tokyo (JP); Toshiaki Kurosu, Kawasaki (JP); Masataka Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 12/983,505

(22) Filed: Jan. 3, 2011

(65) Prior Publication Data

US 2011/0167636 A1 Jul. 14, 2011

(30) Foreign Application Priority Data

Jan. 14, 2010 (JP) ................................ 2010-005863

(51) Int. Cl.
*B21D 53/76* (2006.01)
*B23P 17/00* (2006.01)

(52) U.S. Cl. ...... 29/890.1; 29/25.35; 310/327; 310/329; 310/330; 347/20; 347/54; 347/56; 347/63; 361/700

(58) Field of Classification Search ................. 29/25.35, 29/890.1; 310/328–330; 347/20, 54, 56, 347/63, 68, 70, 71; 361/700
See application file for complete search history.

(56) References Cited

U.S. PATENT DOCUMENTS 6,755,510 B2 * 6/2004 Murakami et al. .............. 347/63
6,971,736 B2 * 12/2005 Tomizawa et al. .............. 347/61
6,984,026 B2 * 1/2006 Tomizawa et al. .............. 347/61
7,090,334 B2 * 8/2006 Tomizawa et al. .............. 347/47
7,287,847 B2 10/2007 Fujii et al.
7,300,596 B2 11/2007 Murayama et al.
7,513,601 B2 4/2009 Asai et al.
7,523,553 B2 4/2009 Ohsumi et al.
7,629,111 B2 12/2009 Kubota et al.
7,857,429 B2 12/2010 Ozaki et al.
7,901,064 B2 3/2011 Urayama et al.
2006/0277755 A1 12/2006 Kubota et al.
2007/0207414 A1 9/2007 Murayama et al.
(Continued)

FOREIGN PATENT DOCUMENTS

JP 2007-125810 A 5/2007

OTHER PUBLICATIONS

English translation of Japanese Laid-open Patent Appln. No. 2007-125810.

*Primary Examiner* — Paul D Kim
(74) *Attorney, Agent, or Firm* — Fitzpatrick, Cella, Harper & Scinto

(57) ABSTRACT

There is disclosed a manufacturing method of a liquid discharge head including a substrate in which a first energy generating element and a second energy generating element that generate energy used for discharging liquid are provided, a discharge port member in which a first discharge port discharging the liquid is provided corresponding to the first energy generating element and a second discharge port discharging the liquid is provided corresponding to the second energy generating element, and a flow path wall member having a portion of the liquid flow path wall that communicates with the first discharge port and the second discharge port, in which a distance between the second energy generating element and the second discharge port is larger than that between the first energy generating element and the first discharge port.

4 Claims, 3 Drawing Sheets

U.S. PATENT DOCUMENTS

2007/0252872 A1 11/2007 Fujii et al.
2008/0024574 A1 1/2008 Donaldson et al.
2008/0094454 A1 4/2008 Koyama et al.
2009/0133256 A1 5/2009 Okano et al.
2009/0136875 A1 5/2009 Kubota et al.
2009/0167812 A1 7/2009 Asai et al.
2009/0191487 A1 7/2009 Murayama et al.
2009/0229125 A1 9/2009 Kato et al.

* cited by examiner

MANUFACTURING METHOD OF LIQUID DISCHARGE HEAD

BACKGROUND OF THE INVENTION

1. Field of the Invention

The present invention relates to a liquid discharge head and a manufacturing method of the liquid discharge head that performs recording on a recording medium by discharging the liquid from a discharge port.

2. Description of the Related Art

A liquid discharge head is known, wherein the liquid discharge head includes a liquid discharge energy generating element that generates energy for discharging liquid droplets, and a discharge port member having a discharge port on a substrate. A flow path is formed between the liquid discharge energy generating element and the discharge port member. When liquid reserved in the flow path is discharged from the discharge port, liquid droplets land on a recording medium such as a recording paper to form dots, whereby the recording is performed.

In recent years, a liquid discharge head has been suggested wherein the liquid discharge head includes a plurality of discharge ports having different opening areas. The liquid discharge head may discharge the liquid droplets having different sizes from one liquid discharge head, whereby a place having a fine dot is recorded with a small-sized liquid droplet and a place having a large dot is recorded with a large-sized liquid droplet so that the printing time can be shortened without decreasing the recording quality.

If a discharging characteristic such as a discharging speed or refill time (the time between after the liquid droplet is discharged to fill a flow path with the liquid that is supplied within the flow path) is different for each of the discharge ports in the liquid discharge head in which the liquid droplets having different sizes are discharged, there is a concern that the recording quality may be deteriorated.

Thus, US Patent Publication No. 2008/024574 discloses a liquid discharge head in which the thicknesses of the discharge port member are different depending on the size of the opening area of the discharge port.

The method includes: providing a first layer, which becomes a first portion of the discharge port member, on a flow path wall member of the substrate on which the flow path wall member is provided, forming a first discharge port in the first layer, and providing a second layer, which becomes a second portion of the discharge port member, on the first layer. Then the second discharge port is formed in the second layer. However, bonding strength between the first portion and the second portion of the discharge port member that is partially provided on the first portion of the discharge port member is not sufficient according to the materials of the first layer and the second layer, and there are cases where the reliability of the discharge port member is affected in the long term.

SUMMARY OF THE INVENTION

Accordingly, the invention has been made in consideration of the problem in the related art. An object of the invention is to provide a manufacturing method of the liquid discharge head with good yield, the liquid discharge head including the discharge port member having a high reliability in long-term use.

According to an example of the invention, there is provided a manufacturing method of a liquid discharge head, the liquid discharge head including a substrate in which a first energy generating element and a second energy generating element that generate energy used for discharging liquid are provided, a discharge port member in which a first discharge port discharging the liquid is provided corresponding to the first energy generating element and a second discharge port discharging the liquid is provided corresponding to the second energy generating element, and a flow path wall member having a portion of a liquid flow path wall that communicates with the first discharge port and the second discharge port, in which a distance between the second energy generating element and the second discharge port is larger than that between the first energy generating element and the first discharge port; and the method including: providing a first layer, which becomes a first portion of the discharge port member, on the flow path wall member of the substrate on which the flow path wall member is provided; forming the first portion by forming the first discharge port, an opening corresponding to the second discharge port, and a slot on the first layer by removing a portion of the first layer; providing a second layer, which becomes a second portion of the discharge port member, on the first portion, so as to cover the first discharge port and the opening and embed the slot; and forming the discharge port member by removing a portion of the second layer to expose the first discharge port and to form the second discharge port in a position that corresponds to the opening.

According to the invention, the liquid discharge head including the discharge port member with reliability in long-term usage may be manufactured with good yield.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
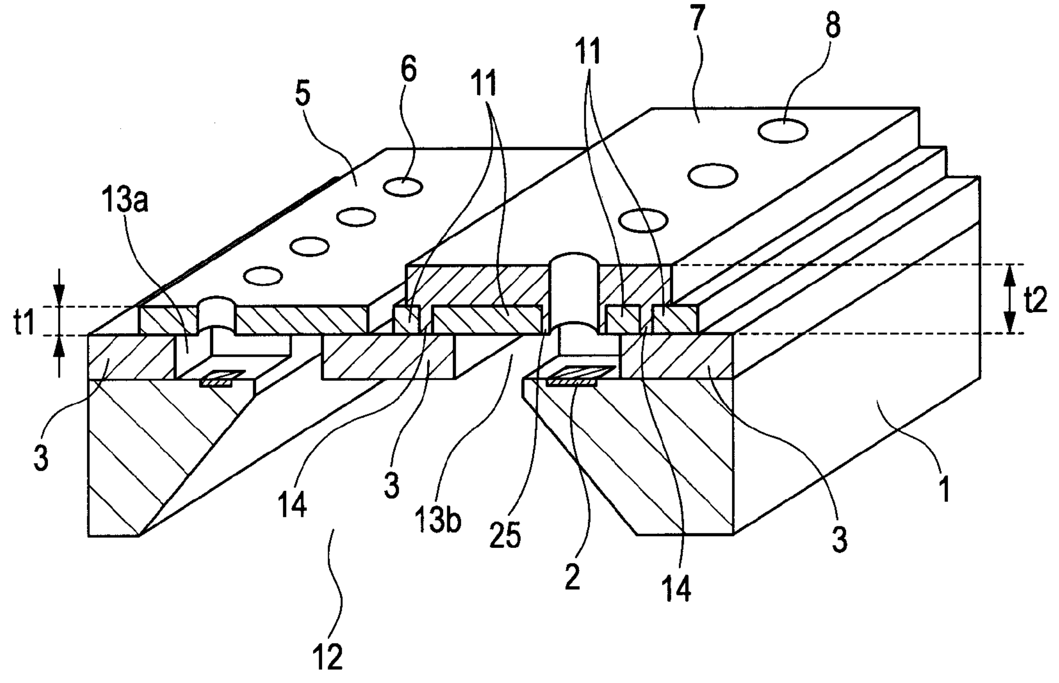
FIG. 1 is a cross-sectional perspective view illustrating a liquid discharge head according to a first embodiment of the invention.

FIG. 1 is a cross-sectional perspective view illustrating a liquid discharge head that is manufactured according to an embodiment of the invention. In one side surface of the liquid discharge head that is illustrated in FIG. 1, a plurality of liquid discharge energy generating elements 2 is arranged and flow path walls 3 are formed in the surface with a constant height so as to surround the liquid discharge energy generating elements 2. A heating resistance element or the like that generates heat energy is used as the liquid discharge energy generating element 2.

Also, discharge port members including a first discharge port member and a second discharge port member are formed on a surface of the flow path wall 3 that is opposite the substrate 1. In the description of the specification, the first discharge port member is a discharge port member (hereinafter, referred to as a small liquid droplet discharge port member 5) for discharging the first liquid droplets and the second discharge port member is a discharge port member (hereinafter, referred to as a large liquid droplet discharge port member 7) for discharging the second liquid droplets that are larger than the first liquid droplets.

A first flow path 13*a* is formed to be surrounded by the small liquid droplet discharge port member 5, the substrate 1 and the flow path wall 3. A second flow path 13*b* is formed to be surrounded by the large liquid droplet discharge port member 7, the substrate 1 and the flow path wall 3. The first flow path 13*a* and the second flow path 13*b* are communicated with an ink container (not shown) through the supply port 12. Liquid is supplied from a liquid container and is reserved in the first and second flow paths 13*a* and 13*b*.

In the positions of the small liquid droplet discharge port member 5 and the large liquid droplet discharge port member 7, that are opposite to the liquid discharge energy generating element 2, a discharge port (hereinafter, referred to as a small liquid droplet discharge port 6) that discharges the first liquid droplet and a discharge port (hereinafter, referred to as a large liquid droplet discharge port 8) that discharges the second liquid droplet are formed. An opening area of the large liquid droplet discharge port 8 is larger than that of the small liquid droplet discharge port 6 so as to discharge from the large liquid droplet discharge ports 8 the second liquid droplets having the size larger than that of the first liquid droplet discharged from the small liquid droplet discharge port 6.

Also, a thickness t2 of the large liquid droplet discharge port member 7 is larger than a thickness t1 of the small liquid droplet discharge port member 5 and a depth of a hole of the large liquid droplet discharge port 8 is larger than that of the small liquid droplet discharge port 6. As the thickness t2 becomes large, the size of resistance, which the liquid droplet discharged from the large liquid droplet discharge port 8 receives, becomes large. Accordingly, discharge characteristics such as a discharge speed or refill time may be adjusted in the large liquid droplet discharge port 8 and the small liquid droplet discharge port 6.

The large liquid droplet discharge port member 7 is provided on a flat member 11 having the same height as the small liquid droplet discharge port member 5. The flat members 11 are formed from a first material layer having a constant thickness so as to form the small liquid droplet discharge port member 5. In other words, the flat members 11 and the small liquid droplet discharge port member 5 are formed from the same first material layer. Due to flat members 11, when the large liquid droplet discharge port member 7 is formed, it is possible to make flat surface of the second material layer in which the large liquid droplet discharge port member 7 is formed.

Also, the flat member 11 has a slot 14, and a material forming the large liquid droplet discharge port member 7 is permeated in the slot 14. Furthermore, the flat members 11 have penetrating holes 25 that include the large liquid droplet discharge ports 8 therein. The material forming the large liquid droplet discharge port member 7 is permeated in the slot 14 and the penetrating hole 25, so that contact area between the flat member 11 and the large liquid droplet discharge port member 7 becomes large and adhesiveness is increased between the flat member 11 and the large liquid droplet discharge port member 7.

Next, the operation of the liquid discharge head will be described.

The liquid that is supplied to a first flow path 13*a* and a second flow path 13*b* through the supply port 12 from a liquid container (not shown) receives heat energy from the liquid discharge energy generating element 2. The liquid is heated by the heat energy to generate bubbles, and the liquid droplets are discharged from the small liquid droplet discharge ports 6 or the large liquid droplet discharge ports 8 by a force resulting from the generation of the bubbles. The liquid droplet lands on the recording medium such as the recording paper to form dots, whereby the recording is performed.

In the images to be formed on the recording medium, recording is performed with small size liquid droplets discharged from the small liquid droplet discharge ports 6 in a place in which the dot is fine and recording is performed with large size liquid droplets that are discharged from the large liquid droplet discharge ports 8 in a place in which the dot is large, so that the printing time is capable of being shortened. Also, the discharge characteristics in the small liquid droplet discharge port member 5 and the large liquid droplet discharge port member are adjusted by the difference provided between the thickness t1 and the thickness t2, so that high quality recording may be enabled.

FIGS. 2A to 2J, FIGS. 3A and 3B are cross-sectional diagrammatic views illustrating the manufacturing process of the liquid discharge head shown in FIG. 1. In the manufacturing of the liquid discharge head according to the embodiment, a photolithography technique used in the manufacturing of a semiconductor element may be applied.

Figure 2A:
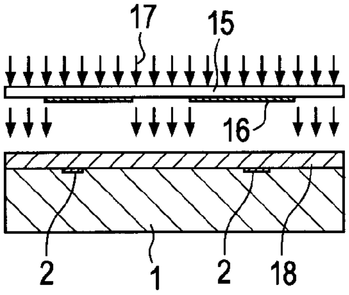
FIGS. 2A, 2B, 2C, 2D, 2E, 2F, 2G, 2H, 2I and 2J are cross-sectional views illustrating a process of a manufacturing method of the liquid discharge head according to the invention.

First, as shown in FIG. 2A, a flow path wall member forming layer 18 is coated by a spin coat method on a surface of the substrate 1 on which the liquid discharge energy generating element 2 is arranged. As the flow path wall member forming layer 18, a negative type photosensitive resin material known as a photoresist is used in which a portion that is responsive to light is cured.

In the spin coat method, the photoresist is dropped in a liquid state at a center portion of the surface of the substrate 1 and the photoresist dropped is widened toward a peripheral portion of the substrate 1 by a centrifugal force generated by the high speed rotation of the substrate 1. The photoresist may be uniformly coated on the overall surface of the substrate 1 by the spin coat method.

Next, moving to an exposure process, a UV light 17 is irradiated onto the flow path wall member forming layer 18 to cause a reaction in the flow path wall member forming layer 18. At this time, the irradiation of the UV light 17 is performed through a mask 15 in which a Cr pattern 16 is provided. The Cr pattern 16 is formed so as not to irradiate the UV light 17 onto an area at which the first flow path 13*a* and the second flow path 13*b* (FIG. 1) of the flow path wall member forming layer 18 are formed. Accordingly, the reaction caused by the UV light 17 does not occur in the flow path wall member forming layer 18 of an area at which the first flow path 13*a* and the second flow path 13*b* are formed.

Figure 2B:
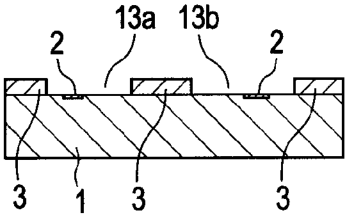

After the flow path wall member forming layer 18 is exposed, a development liquid permeates in the flow path wall member forming layer 18. At this time, the area of the flow path wall member forming layer 18 onto which the UV light 17 is not irradiated is removed by the development liquid. Accordingly, as shown in FIG. 2B, the portion of the flow path wall member forming layer 18 in which the resin is removed becomes the first flow path 13*a* and the second flow path 13*b*, and then the portion in which the resin is left becomes the flow path wall 3 that has a constant height.

Also, since the flow path wall 3 may be cut-out in the following polishing processing, the flow path wall member forming layer 18 may be coated thicker than a design dimension of the flow path wall 3 in a state that the liquid discharge head is completed.

Figure 2C:
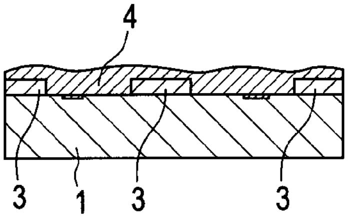

Subsequently, as shown in FIG. 2C, embedded members 4 are coated so as to cover the liquid discharge energy generating element 2 and the flow path wall 3. At this time, the embedded member 4 is coated so as to embed the flow path 13. A material that is used as the embedded member 4 may be any material as long as the material has no problem of compatibility with the flow path wall 3, is easily removed and is suitable for the polishing processing.

Figure 2D:
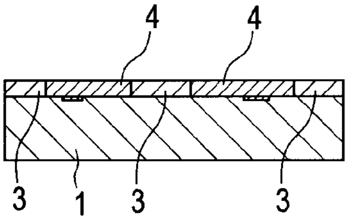

As shown in FIG. 2D, the polishing process is performed on the embedded member 4 near a point of time after the coating of the embedded member 4 has been completed until the surface of the flow path wall 3 emerges. The surface of the flow path wall 3 may be also polished so as to flatten the surfaces of the embedded member 4 and the flow path wall 3.

Figure 2E:
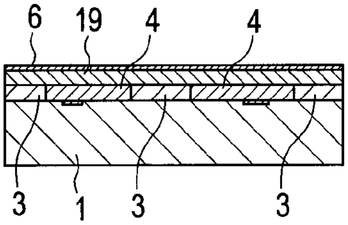

Next, as shown in FIG. 2E, a first resin layer 19 is coated by the spin coat method so as to form a first portion of the discharge port member on the surfaces of the flow path wall 3 and the embedded member 4. The surface of the first resin layer 19 may also be easily flattened since the surfaces of the flow path wall 3 and the embedded member 4 are flattened.

Furthermore, a first repellent material 9 for repelling the liquid is formed on the surface of the first resin layer 19. The first repellent material 9 becomes the surface of the small liquid droplet discharge port member 5 of the liquid discharge head shown in FIG. 1. When the liquid droplets are discharged from the liquid discharge head, the first repellent material 9 prevents the liquid from attaching to the small liquid droplet discharge port member 5. Since the liquid is not attached to the small liquid droplet discharge port member 5, the recording quality and durability of the liquid discharge head are enhanced.

Subsequently, the UV light is irradiated onto the first resin layer 19 to cure the first resin layer 19, similarly to the case in which the flow path wall 3 is formed in FIG. 2B. The Cr patterns of the mask that are used when the UV light is irradiated onto the first resin layer 19 are provided correspondingly to an area in which the small liquid droplet discharge port 6 is formed, an area in which the penetrating hole 25 is formed, and an area in which the slot 14 is formed.

Figure 2F:
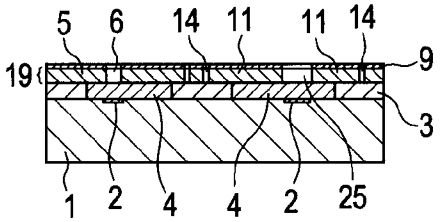

The development liquid permeates the first resin layer 19 after the UV light is irradiated, such that the area of the first resin layer 19 onto which the UV light is not irradiated is removed by the development liquid. As shown in FIG. 2F, a portion of the first resin layer 19 in which the resin is removed becomes the small liquid droplet discharge port 6, the penetrating hole 25 and the slot 14, and a portion in which the resin is left becomes the small liquid droplet discharge port member 5 and the flat member 11 with a constant thickness. In other words, the flat member 11 is formed at the same time as the formation of the small liquid droplet discharge port member 5. As described above, the first portion of the discharge port member is formed from the first resin layer 19.

Since the surface of the first resin layer 19 is formed to be flat, a focus deviation is not generated in the exposure process and the small liquid droplet discharge port 6 may be precisely formed.

Figure 2G:
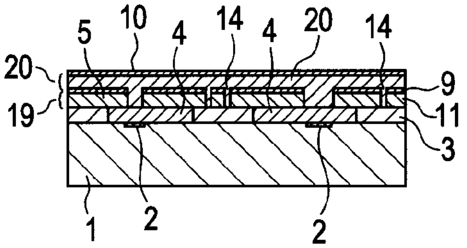

Next, as shown in FIG. 2G, the second resin layer 20 is coated on the first resin layer 19 and the remaining areas so as to form a second portion of the discharge port member. Even though small liquid droplet discharge port 6, the slot 14 and the penetrating hole 25 are formed at the first resin layer 19, and the surface of the second resin layer 20 may be coated uniformly, since the opening areas thereof are small.

Furthermore, a second repellent material 10 is coated on the surface of the second resin layer 20. The second repellent material 10 prevents the liquid from attaching to the large liquid droplet discharge port member 7 and the recording quality and durability of the liquid discharge head may be enhanced in the same manner as the first repellent material 9.

The adhesiveness between the first repellent material 9 and the second resin layer 20 that are formed on the surface of the flat member 11 is not sufficiently secured. Thus, in the embodiment, the slot 14 is provided in the flat member 11, and the second resin layer 20 and the flat member 11 in which the first repellent material 9 is not formed are brought into contact with each other so that the adhesiveness between the flat member 11 and the second resin layer 20 is increased.

Figure 2H:
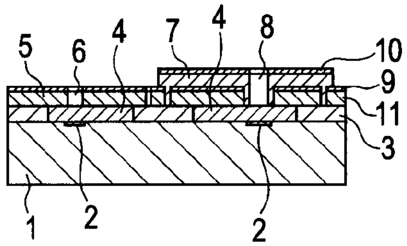

The large liquid droplet discharge port 8 as shown in FIG. 2H is formed using the photolithography technique in the same manner as when the flow path wall 3 or the small liquid droplet discharge port 6 is formed in FIG. 2B or FIG. 2F. Since the surface of the second resin layer 20 is uniformly coated, the large liquid droplet discharge port 8 is precisely formed without the focus deviation being generated at the time of exposure. As described above, the second portion of the discharge port member is formed from the second resin layer 20. At this time, a portion of the second resin layer 20 is removed to expose the small liquid droplet discharge port 6.

Next, the substrate 1 is immersed in a heated alkaline etching liquid for a predetermined time and the supply port 12 is formed. Finally, by removing the embedded member 4 charged in the flow path 13, the supply port 12 communicates with the flow path 13 and the supply of the discharge liquid toward the flow path 13 from the liquid container (not shown) is enabled.

In the manufacturing method of the invention, the variation in the shape or size of the discharge port may be suppressed since at the time of forming the discharge port member, the discharge port is formed after the surface of the resin layer that becomes the discharge port member is formed to be flat as shown in FIG. 2E or FIG. 2G.

Figure 3A:
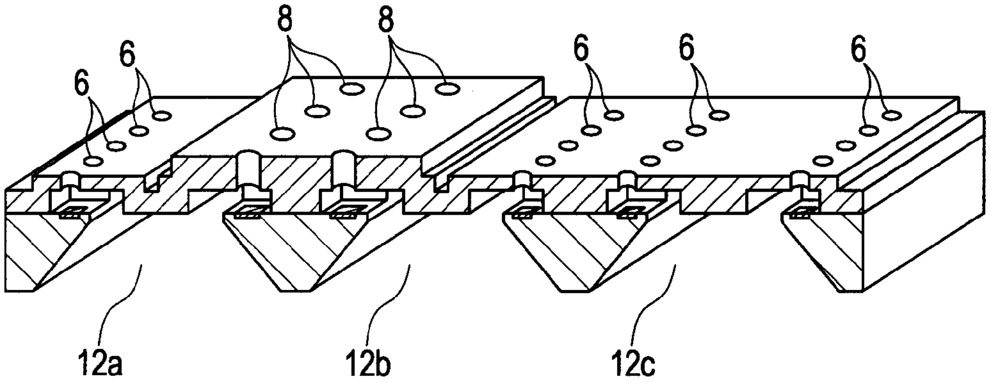
FIGS. 3A and 3B are cross-sectional perspective views of the liquid discharge head according to another embodiment of the invention.
Figure 3B:
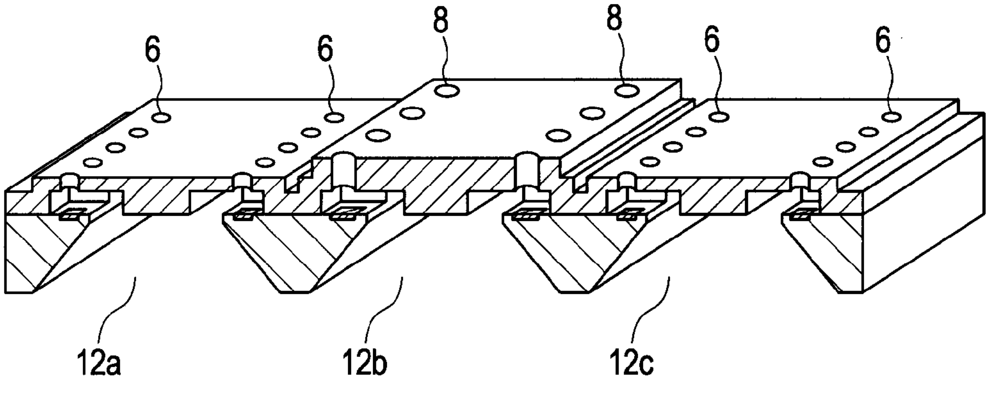

The manufacturing method of the invention may also be applied to the liquid discharge head that discharges plural different kinds of liquid shown in FIGS. 3A and 3B.

FIG. 3A is cross-sectional perspective view of the liquid discharge head including the supply ports 12*a*, 12*b* and 12*c*. For example, Yellow, magenta and cyan ink may be supplied from the supply ports 12*a*, 12*b* and 12*c* in the liquid discharge head shown in FIG. 3A. The supply port 12*a* communicates with the small liquid droplet discharge port 6 and the large liquid droplet discharge port 8 and the supply port 12*b* communicates with the small liquid droplet discharge port 6 and the large liquid droplet discharge port 8. The supply port 12*c* communicates with only the small liquid droplet discharge port 6.

Accordingly, in the liquid discharge head shown in FIG. 3A, the small size liquid droplet and the large size liquid droplet may be discharged in the yellow and the magenta, and only the small size liquid droplet may be discharged in the cyan.

FIG. 3B is a cross-sectional perspective view of the liquid discharge head having an arrangement of the large liquid droplet discharge port and the small liquid droplet discharge port, which is different from the liquid discharge head shown in FIG. 3A. The supply port 12*a* and the supply port 12*c* communicate with the small liquid droplet discharge port 6, and the supply port 12*b* communicates with the large liquid droplet discharge port 8.

As described above, the arrangement of the large liquid droplet discharge port and the small liquid droplet discharge port may be easily changed by changing the mask and Cr pattern that are used in the exposure process.

In the embodiment, the small liquid droplet discharge port member 5 and the large liquid droplet discharge port member 7 are formed with the same material; however, the small liquid droplet discharge port member 5 and the large liquid droplet discharge port member 7 may be formed with different materials if the adhesiveness to the flow path wall is sufficient.

Also, the resin layer constituting the flow path wall 3, the small liquid droplet discharge port member 5 and the large liquid droplet discharge port member 7 are not limited to a negative type photosensitive resin material and may be a positive type photosensitive resin material of which an exposed portion is dissolved.

Hereinafter, the embodiment is illustrated and the invention is described in detail.

(Embodiment)

The substrate 1 in which the heating resistance element (material: TaSiN) is arranged as the liquid discharge energy generating element 2 is prepared. Also, a driver, a logic circuit or the like that drive the heating resistance element are formed in the substrate 1.

The negative type photosensitive resin material having a composition described below is coated on the surface in which the heating resistance element of the substrate 1 is arranged using a spin coat method, the surface is baked on a hot plate at 90° C. for 5 minutes to form the flow path wall member forming layer 18 having a thickness of 14 μm (see FIG. 2A).

(Composition)

EHPE (manufactured by DAICEL CHEMICAL INDUSTRIES, LTD.): 100 parts by weight

SP-172 (manufactured by ADEKA CORPORATION): 2 parts by weight

A-187 (manufactured by NIPPON UNICAR CO., LTD.): 5 parts by weight methyl isobutylketone: 100 parts by weight diglyme: 100 parts by weight Subsequently, exposure is performed by the exposure apparatus (hereinafter, referred to as an i-ray stepper) using i-ray as a light source, the development is performed by a mixed solution of xylene of 60% and methyl isobutylketone of 40% to form the first flow path 13*a* and the second flow path 13*b* (see FIG. 2B). After the first flow path 13*a* and the second flow path 13*b* are formed, a remaining portion of the flow path wall member forming layer 18 is baked in an oven at 140° C. to cure the photosensitive resin material serving as the flow path wall 3.

Next, dissoluble ODUR (manufactured by TOKYO OHKA KOGYO CO., LTD.) is used as the embedded member 4, the embedded member 4 is coated to a position of the thickness of 16 μm from the flow path wall 3 by the spin coat method, the baking is performed on the hot plate at 120° C. for 6 minutes and the embedded member 4 is formed (see FIG. 2C). The embedded member 4 on the flow path wall 3 is polished by Chemical Mechanical Polishing (CMP) to 16 μm to expose the flow path wall 3 (see FIG. 2D).

Furthermore, the negative type photosensitive resin material having the same composition as the flow path wall 3 is coated to the thickness of 10 μm from the flow path wall 3 by the spin coat method, the baking is performed on the hot plate at 90° C. for 5 minutes to form the first resin layer 19. Furthermore, the water-repellent material 9 is formed in the surface thereof with the thickness of 0.5 μm (see FIG. 2E).

The exposure of the first resin layer 19 is performed by an i-ray stepper, the development is performed with the mixed solution of xylene of 60% and methyl isobutylketone of 40% to collectively form the small liquid droplet discharge port member 5 and the flat member 11 (FIG. 2F).

Subsequently, the negative type photosensitive resin material having the same composition as the flow path wall 3 is coated to the thickness of 20 μm from the small liquid droplet discharge port member 5 by the spin coat method, the baking is performed on the hot plate at 90° C. for 5 minutes to form the second resin layer 20. Furthermore, the second repellent material 10 is coated on the surface of the second resin layer 20 with the thickness of 0.5 μm (FIG. 2G). In addition to the spin coat method, the method for providing the second resin layer 20 may include a direct coat method or a method, in which a film of the second resin layer 20 is transferred.

The exposure of the second resin layer 20 is performed by the i-ray stepper, the development is performed by the mixed solution of xylene of 60% and methyl isobutylketone of 40% to form the large liquid droplet discharge port 8 (FIG. 2H). The baking is performed in the oven at 140° C. to cure the second resin layer 20 serving as the large liquid droplet discharge port member 7.

Figure 2I:
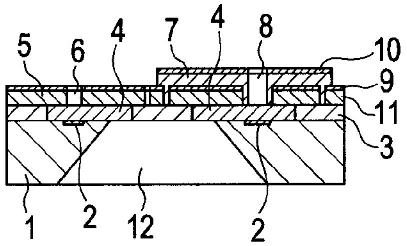
Figure 2J:
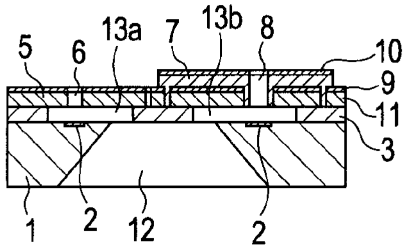

Next, the substrate in which the small liquid droplet discharge port 6 and the large liquid droplet discharge port 8 are formed is immersed in TMAH (Tetramethyl ammonium hydroxide) aqueous solution of 22 wt % that is heated and temperature controlled to about 80° C. for tens of hours. As shown in FIG. 2I, the substrate 1 is etched to form the supply port 12.

Finally, the embedded member 4 that remains as mold-material of the flow path 13 is immersed in methyl lactate that is heated and temperature controlled to about 40° C. to collectively remove the embedded members 4 by the dissolution. The photosensitive resin material is completely cured in the oven at 200° C. to form the liquid discharge head (see FIG. 2J).

As described above, after the liquid discharge head produced by the manufacturing method according to the embodiment is loaded on the recording apparatus, the discharge and the recording characteristics were estimated. As a result, good image recording characteristics were obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-005863, filed Jan. 14, 2010, which is hereby incorporated by reference herein in its entirety.

What is claimed is:

1. A manufacturing method of a liquid discharge head including a substrate in which a first energy generating element and a second energy generating element that generate energy used for discharging liquid are provided, a discharge port member in which a first discharge port discharging the liquid is provided corresponding to the first energy generating element and a second discharge port discharging the liquid is provided corresponding to the second energy generating element, and a flow path wall member having a portion of a liquid flow path wall that communicates with the first discharge port and the second discharge port, in which a distance between the second energy generating element and the second discharge port is larger than that between the first energy generating element and the first discharge port, the method comprising:

providing a first layer, which becomes a first portion of the discharge port member, on the flow path wall member of the substrate on which the flow path wall member is provided;

forming the first portion by forming the first discharge port, an opening corresponding to the second discharge port, and a slot on the first layer by removing a portion of the first layer;

providing a second layer, which becomes a second portion of the discharge port member, on the first portion, so as to cover the first discharge port and the opening and embed the slot; and forming the discharge port member by removing a portion of the second layer to expose the first discharge port and to form the second discharge port in a position that corresponds to the opening.

2. The manufacturing method of a liquid discharge head according to claim 1, wherein in forming the first portion, the first discharge port, the opening corresponding to the second discharge port, and the slot are formed collectively.

3. The manufacturing method of a liquid discharge head according to claim 1, wherein an upper surface of the first portion has repellency.

4. The manufacturing method of a liquid discharge head according to claim 3, wherein the second layer is provided so as to contact an inner wall of the opening, and the second discharge port is formed, such that the portion of the second layer, which is in contact with the inner wall, forms a wall surface of the flow path communicating with the second discharge port.

* * * * *